June 3, 1969     G. MEHNERT     3,447,680
TRANSPORTING APPARATUS FOR BLOW MOLDED ARTICLES
Filed Aug. 8, 1967     Sheet 1 of 2
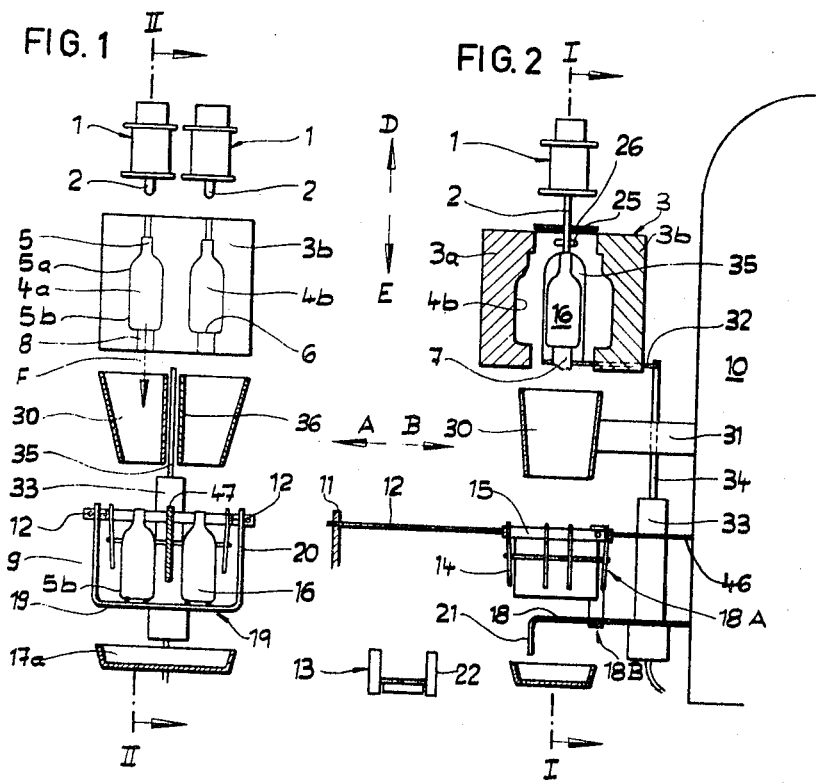
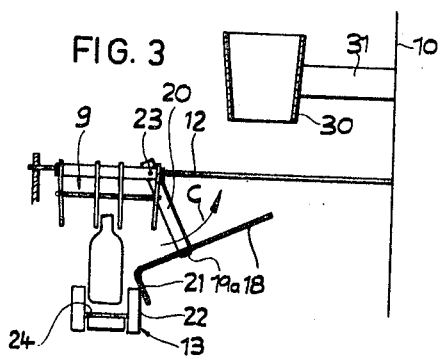

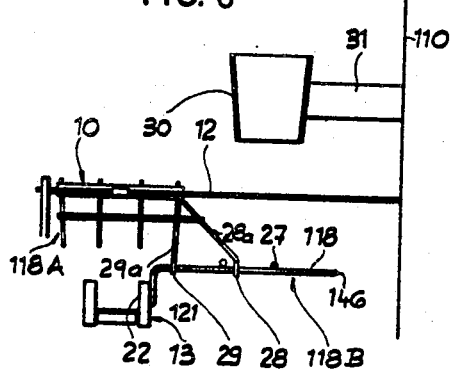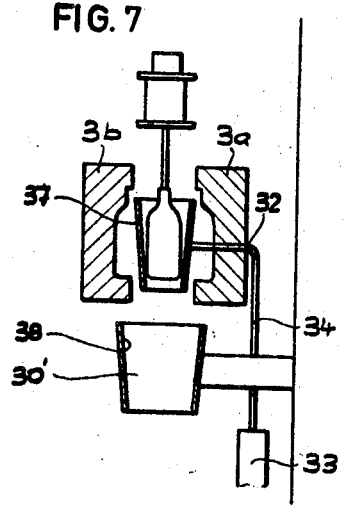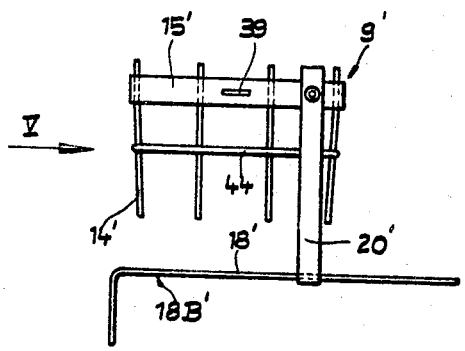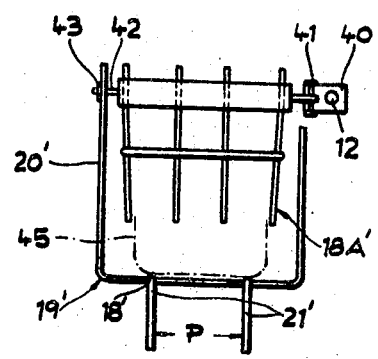

United States Patent Office 3,447,680
Patented June 3, 1969

3,447,680
TRANSPORTING APPARATUS FOR BLOW MOLDED ARTICLES
Gottfried Mehnert, Lankwitzerstrasse 14–15,
Berlin-Mariendorf, Germany
Filed Aug. 8, 1967, Ser. No. 659,223
Claims priority, application Germany, Aug. 11, 1966,
M 55,989
Int. Cl. B07b 13/16; B07c 9/00
U.S. Cl. 209—73                      20 Claims

ABSTRACT OF THE DISCLOSURE

Hollow synthetic plastic articles which are formed in the cavity of a mold are discharged by gravity in response to opening of the mold, together with flashes or like surplus material which is separated from the articles during or subsequent to opening of the mold. A receptacle is reciprocable at a level below the mold between a first position in which its bottom portion intercepts descending articles but permits further descent of surplus material and a second position out of registry with the mold. A take-off conveyor receives articles which descend from the receptacle in the latter's second position and in response to automatic movement of bottom portion to open position.

Background of the invention

The present invention relates to blow molding machines in general, and more particularly to improvements in the treatment and transportation of blow molded articles immediately after opening of the blow mold. Still more particularly, the invention relates to a transporting apparatus which can be utilized to receive blow molded articles from the mold and to deliver such articles to a conveyor which advances the articles past one or more processing stations.

It is already known to provide a blow molding apparatus with a mold which defines one or more mold cavities and which can convert tubular, strip-like or otherwise shaped parisons into bottles, cans, ampoules, cartridges or other types of hollow plastic articles by controlled admission of gas into the parisons. The parisons may be fed continuously or intermittently, and the freshly formed articles are normally discharged from the mold by gravity feed. The admission of gas into parisons is normally effected by mandrels or needles and, if the machine utilizes one or more mandrels, such mandrels may also serve to calibrate from within the neck portion of a bottle or the connecting nipple, inlet and/or outlet of another type of hollow plastic article. Furthermore, it is also known to expand the parisons by suction.

In the manufacture of plastic bottles by blowing of tubular parisons, the leading or lower end of the parison is normally pinched by the jaws of mold sections so that such jaws seal the lower end of the parison. The mandrel is introduced into the upper end of the parison and admits air or another gas to expand the median part of the parison against the surfaces bounding the mold cavity. Surplus material remains at both ends of a freshly formed bottle due to pinching (at the lower end) and due to separation of a ring-shaped surplus from the neck. If the gas is admitted by means of a needle which is normally rigid with one of the mold sections and penetrates an intermediate portion of the parison in response to closing of the mold, the mold sections are provided with additional jaws which pinch the upper end of the parison so that the finished article will have surplus material at both ends and often also in the region where the needle passes through the material of the parison. For example, such needle can be mounted to penetrate radially the neck portion of a plastic bottle.

Modern blow molding machines are designed to utilize the plasticized material with a minimum of waste; nevertheless, some surplus material remains and must be separated from plastic bottles or like blow molded articles prior to filling and/or other treatment. As a rule, the surplus adheres to the useful part of a freshly formed blow molded article by a thin web which can be readily destroyed, preferably by means of stripping and like devices which are mounted on or adjacent to the mold. The segregated particles of surplus material must be removed from the molding station without delay because they could interfere with the next blowing cycle. For example, certain blow molding machines employ stripping devices which break away the surplus at the lower end of a freshly formed bottle (such surplus adheres to the bottom wall of the bottle by a thin web which is formed by the pinching jaws of the mold sections during closing of the mold) so that the surplus can descend by gravity. The surplus at the upper end (neck portion) of the bottle is separated while the mandrel still extends into the neck portion after the mold sections are moved apart so that the bottle is supported solely by the mandrel. The mandrel then emits a blast of gas which separates the bottle so that the latter can descend by gravity. The surplus which has been separated from the neck portion forms a ring around the mandrel and is separated therefrom when the mandrel moves upwardly to a position ready for penetration into the next parison.

As stated before, nearly all types of presently known blow molding machines discharge the articles and surplus material by gravity, normally in such a way that the articles and the surplus material can descend onto a conveyor or into a receptacle. The surplus is removed by hand or by semiautomatic or fully automatic sorting devices. Such sorting is carried out prior to arraying of articles for proper guidance past one or more processing stations where the articles are labelled, filled, cleaned, capped or subjected to other treatment. The surplus can interfere with proper transportation of bottles or like blow molded articles, particularly if the bottles are transported on a belt or band conveyor. Such surplus is often tough and can cause serious damage or complete breakdown if permitted to enter between the moving parts of the conveyor.

Summary of the invention

It is an important object of my invention to provide a blow molding machine for the production of bottles or other types of hollow plastic articles which avoids the drawbacks of aforementioned conventional machines and wherein the articles are transported in a fully controlled and predictable way as soon as they leave the cavity or cavities of the mold.

Another object of the invention is to provide a transporting apparatus for use in blow molding machines and to construct and assemble the apparatus in such a way that it automatically segregates surplus material from finished blow molded articles.

A further object of the instant invention is to provide a transporting apparatus which can deliver blow molded articles to a conveyor in accurately determined position which is best suited for further treatment.

An additional object of the invention is to provide a transporting apparatus which can effect reorientation of blow molded articles in the region between the mold and the conveyor which supports the articles on their way to and/or during further processing.

A concomitant object of the invention is to provide a transporting apparatus which can simultaneously accommodate two or more blow molded articles.

Another object of the invention is to provide a novel method of collecting surplus material which is segregated from freshly blown plastic articles.

A concomitant object of the invention is to provide a transporting apparatus which can handle many types of blow molded articles, which can be readily converted for transportation of differently dimensioned and/or configurated articles, and which can simultaneously transport two or more types of articles.

Briefly outlined, my invention resides in the provision of a transporting apparatus which is installed in a blow molding machine of the type wherein hollow articles formed in the cavity of an open-and-shut mold descend by gravity and wherein surplus material which is separated from articles also descends by gravity from the open mold. The apparatus comprises a receptacle which is movable between a first position at a level below and in line with the direction of descent of articles and surplus material and a second position out of registry with such direction, a bottom portion or gate of the receptacle being movable between a closed position in which it supports articles from below during travel of the receptacle from first to second position but permits further descent of surplus material and an open position to permit further descent of articles in the second position of the receptacle. The apparatus further comprises conveyor means for accepting articles which are free to descend in response to movement of the bottom portion to open position in the second position of the receptacle.

The means for opening the bottom portion in the second position of the receptacle may comprise a stop on the conveyor and a motion receiving part provided on the bottom portion and engaging with the stop to pivot, shift or otherwise displace the bottom portion while the receptacle approaches its second position.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a schematic vertical sectional view of a blow molding machine embodying a transporting apparatus which is constructed in accordance with a first embodiment of my invention, the section being taken in the direction of arrows substantially as seen from the line I—I of FIG. 2;

FIG. 2 is a transverse vertical sectional view, substantially as seen in the direction of arrows from the line II—II of FIG. 1;

FIG. 3 illustrates a portion of the structure shown in FIG. 2, the receptacle being shown in its second position above the conveyor means;

FIG. 4 is a side elevational view of a modified receptacle;

FIG. 5 is a view as seen in the direction of the arrow V in FIG. 4;

FIG. 6 is a fragmentary view of a modified transporting apparatus wherein the receptacle comprises a reciprocable bottom portion; and FIG. 7 illustrates a portion of a further transporting apparatus wherein freshly formed articles must pass through several aligned guides to retain their orientation during descent into the receptacle.

Description of the preferred embodiments

FIGS 1 and 2 illustrate, rather schematically, a portion of a blow molding machine which embodies one form of the improved transporting apparatus. The machine comprises an open-and-shut mold 3 having two sections 3a, 3b which define two mold cavities 4a, 4b when the mold is closed. The mechanism for opening and closing the mold 3 is not shown. This mold is installed at a level below two blowing heads 1 each of which registers with one of the cavities 4a, 4b when the mold is closed and each of which comprises a vertically reciprocable blowing mandrel 2. FIG 1 illustrates the mandrels 2 in retracted or upper end positions, and FIG. 2 shows one of the mandrels in extended or lower end position in which the mandrel admits air or another suitable gas into the upper end of a tubular parison which is thereby expanded to form a blow molded article 16 (hereinafter called bottle or plastic bottle). The directions in which the mandrels move up and down are respectively indicated by arrows D and E. The parisons can be extruded through orifices (not shown) in the blowing heads 1, and each of these heads is then connected to or incorporated into a suitable extruder of known design. The numeral 5 denotes in FIG. 1 the top or neck portion of a freshly formed bottle 16. The bottom portion of each bottle carries a plate-like flash 7 of surplus material (see FIG. 2) which is connected to such bottom portion by a thin web formed by cooperating pinching edges or jaws 6 provided on the mold sections 3a and 3b. The surplus material 7 is accommodated in a suitable recess or cutout 8 of the mold 3 when the latter is closed.

The direction in which a finished bottle 16 can descend by gravity from the mold cavity 4a when the mold 3 is open is indicated by an arrow F. In accordance with a feature of my invention, the blow molding machine comprises a transporting apparatus for finished bottles 16, and such apparatus includes a receptacle or basket 9 which is reciprocable at a level below the mold 3 between a first position (shown in FIG. 1) in which it is located in line with the direction indicated by the arrow F and a second position (shown in FIG. 3) in which it is out of registry with the mold cavities 4a, 4b and is located at a level above a take-off conveyor 13. The means for guiding the receptatcle 9 between such positions includes two horizontal rails 12 which are anchored in the housing or frame 10 of the blow molding machine and whose free ends are supported by a stationary bearing plate 11. The directions in which the receptacle 9 can reciprocate between its first and second positions are indicated by arrows A and B. The drive which reciprocates the receptacle 9 along the rails 12 may include an endless chain driven by a reversible motor or the like. Such drive has been omitted in the drawing for the sake of clarity.

The take-off conveyor 13 comprises an endless transporting belt 24 (see FIG. 3) whose upper stringer can accept finished bottles 16 from the receptacle 9 when the latter reaches its second position. In the embodiment of FIGS. 1 to 3, the receptacle 9 is arranged to discharge bottles 16 in such a way that each bottle reaches the upper stringer of the belt 24 in upright position and the conveyor 13 thereupon maintains the bottles in upright position during transport to the next processing station or stations. Transportation of bottles in upright position is preferred in most instances because it facilitates subsequent imprinting, sterilizing, filling, sealing, capping or other treatment. However, it is equally within the purview of my invention to invert the bottles 16 prior to entry into the receptacle 9, during transport with the receptacle, during travel from the receptacle onto the belt 24, during travel with the belt, or to provide the mold 3 with cavities 4a, 4b wherein the bottles are accommodated upside down. For example, the bottles 16 will be inverted or reoriented (either fully or in part) on or upstream of the belt 24 if the nature of machines at the further processing stations is such that the bottles can be packed, cleaned, capped or otherwise treated while travelling upside down or in substantially horizontal position.

In the embodiment of FIGS. 1 to 3, the receptacle 9 comprises a bottom portion or gate 18B and an upper portion or cage 18A which latter supports the gate 18B for pivotal movement about a horizontal axis. The cage 18A comprises an annular frame or top part 15 of rectangular outline and a set of downwardly extending substantially vertical rods or bars 14 which define with the frame 15 a chamber large enough to accommodate two bottles 16 at a time. The frame 15 preferably consists of metallic strip stock. The gate 18B resembles a grate and comprises a network of intersecting and/or parallel rods or bars 18 which define between themselves at least one aperture large enough to permit substantially unimpeded passage of surplus material (flashes 7) which is separated from the bottles 16 on opening of the mold 3. The rods 18 of the gate 18B support the bottom walls of bottles 16 at one, two or more spaced points or along two or more lines, and such rods 18 form a network which invariably intercepts the bottles 16 but allows surplus material 7 to descend further by gravity and to accumulate in a collecting tray 17 located below the mold 3 and at a level below the plane in which the receptacle 9 travels back and forth along the guide rails 12. The tray 17 may form part of an evacuating conveyor which travels continuously or intermittently to deliver surplus material to a dumping station or to a station where such surplus can be used in the production of fresh parisons or for other purposes.

The gate 18B is eccentrically mounted on the cage 18A and normally tends to assume a closed or intercepting position which is shown in FIGS. 1 and 2. The arrangement is such that the gate 18B automatically assumes an open or dumping position when the receptacle 9 reaches the second position shown in FIG. 3. The means for opening the gate 18B comprises one or more L-shaped extensions on the gate and a stop 22 provided on the take-off conveyor 13. When the downwardly projecting parts of the extensions 21 strike against the stop 22 (shortly before the receptacle 9 reaches the second position shown in FIG. 3), the gate 18B begins to pivot about a pair of coaxial horizontal pivot pins 23 and allows the bottles 16 to resume their gravitational descent and to come to rest on the upper stringer of the belt 24.

The grate formed by the rods 18 of the gate 18B is mounted on the web 19a of a U-shaped yoke or bracket 19 whose upwardly extending legs or flanges 20 are pivotally secured to the frame 15 by aforementioned pins 23. The gate 18B actually resembles a swing and its center of gravity is selected in such a way that it normally tends to assume its closed position in which the rods 18 can properly support two bottles 16 from below. The extensions 21 are constituted by laterally extending prongs of two bars 18, these prongs extending in a direction toward the conveyor 13 as clearly shown in FIG. 2. The arrow C denotes in FIG. 3 the direction in which the gate 18B is tilted when the extensions 21 strike against the stop 22. The latter may be constituted by a side wall of the conveyor 13. The conveyor 13 is sufficiently close to the chamber defined by the cage 18A to insure that the bottles 16 cannot tumble or undergo other reorientation during travel from the receptacle 9 onto the belt 24.

If the blow molding machine is arranged to blow articles in inverted position, i.e., if the cavities 4a, 4b are inverted with reference to the positions shown in FIGS. 1 and 2, the rods 18 of the gate 18b can be distributed in such a way that they intercept the shoulders 5a between the neck portions 5 and main body portions 5b of bottles 16 and deposit the neck portions 5 onto the belt 24 during pivotal or other movement to open position. The aperture or apertures defined by the rods 18 are preferably large enough to permit (if necessary) passage of surplus material 25 which is separated from the neck portions 5, particularly if the bottles 16 are allowed to travel downwardly while their neck portions 5 are located below the main body portions 5b. The tray 17 can intercept the surplus material 25 and/or 7. If the bottles 16 are molded in upright position, the surplus 25 need not pass through the gate 18B for reasons which will be explained below.

The movements of the mold sections 3a, 3b toward and away from each other, the movements of the mandrels 2 between extended and retracted positions (arrows D and E), the movements of the receptacle 9 between the first and second positions (arrows A and B), and the movements of other reciprocatory, turnable or otherwise movable parts of the blow molding machine are preferably regulated by a suitable programming system which is not shown in the drawing. For example, the mold 3 can initiate signals in response to movement of its sections 3a, 3b away from each other to rapidly return the receptacle 9 to the first position shown in FIG. 1 or 2. The movement of mold sections 3a, 3b toward each other or the extrrusion of fresh parisons can initiate signals which are employed to effect movement of the receptacle 9 to the second position shown in FIG. 3. The mold 3 will produce a pair of fresh bottles 16 while the receptacle 9 completes a cycle from the first position of FIGS. 1 and 2 to the second position of FIG. 3 and back to first position. The arrangement is preferably such that a stripper 26 which is installed above the mold 3 and surrounds the mandrels 2 separates from these mandrels rings 25 of surplus material which adheres to the mandrels subsequent to gravitational descent of the bottles 16. The stripper 26 is stationary and comes in contact with the surplus 25 when the mandrels 2 are moved to retracted positions (arrow D) and are thereby disengaged from the neck portions 5 of the bottles 16. Such upward movement of mandrels 2 is preferably initiated at a time when the receptacle 9 has left the first position of FIGS. 1 and 2 so that the rings 25 of surplus material are free to descend directly into the tray 17 and need not pass through the gate 18B. The bottles 16 can be expelled from the mold 3 by blasts of air emitted by the mandrels 2 when the receptacle 9 returns to first position.

It will be seen that the receptacle 9 is located at a substantial distance from the lower portions of the mold sections 3a, 3b. This is necessary in certain types of blow molding machines which must provide room directly below the mold. In order to insure that the bottles 16 will be prevented from changing their orientation during travel from the mold cavities 4a, 4b into the chamber of the cage 18A, the transporting apparatus preferably includes a suitable guide assembly in the form of two upwardly diverging funnels 30 installed below the mold cavities 4a, 4b and registering with the chamber of the cage 18A when the receptacle 9 assumes the first position shown in FIGS. 1 and 2. The provision of funnels 30 constitutes a safety measure, and it is equally possible to replace these funnels with other suitable guide means which can insure controlled descent of bottles 16 from the mold cavities 4a, 4b into the receptacle 9. The funnels 30 are secured to the machine frame 10 by means of brackets 31 or like supporting devices.

FIGS. 1 and 2 further show a separator or partition 35 in the form of a blade which is installed in the space between the adjoining parallel vertical walls 36 of the funnels 30 and is mounted on a horizontal rod 32 connected to the upper end portion of a piston rod 34 forming part of a hydraulic or pneumatic cylinder 33 which is mounted on the machine frame 10. This blade-like partition 35 is needed only when the mold 3 is formed with a plurality of cavities and its purpose is to prevent direct contact between two freshly formed bottles 16 when the sections 3a, 3b of the mold 3 move apart. The operation of the cylinder 33 is programmed in such a way that piston rod 34 causes the rod 32 to lift the partition 35 into the space between the bottles 16 when the mold sections 3a, 3b begin to move away from each other. When the mold 3 is closed, the partition 35 is lowered to the end position shown in FIG. 1 in which it occupies the gap between the walls 36 of the funnels 30. When held in raised or upper end position, the partition 35 prevents direct contact and eventual deformation of bottles 16 and further insures that each bottle can descend by gravity without any interference on the part of the other bottle.

In order to improve the stability of the gate 18B when the receptacle 9 assumes the first position shown in FIGS. 1 and 2, the gate is preferably provided with a second extension 46 (shown in FIG. 2) which bears against the adjoining surface of the machine frame 10 and maintains the gate 18B in fully closed position until the receptacle 9 begins to travel in the direction indicated by the arrow A. The extension 46 is constituted by the right-hand end portions of the bars 18 which are long enough to bear against the frame 10 when the receptacle 9 assumes the first position. The provision of such extension 46 or of an equivalent stabilizing device is desirable when the gate 18B is pivotally connected to the cage 18A in order to prevent rocking of the gate 18B in response to impact of bottom portions of bottles 16 against the rods 18.

Also, and in order to insure that the bottles 16 will remain in upright position when they come to rest on the rods 18 of the gate 18B and while the receptacle 9 travels in the direction of the arrow A, the receptacle is preferably provided with a centrally located separating wall 47 which is affixed to the frame 15 and divides the chamber of the cage 18A into two compartments each of which accommodates a bottle 16. However, this wall 47 can also be secured to the bars 14 and it need not extend all the way to the gate 18B. The wall 47 may be assembled of a network of bars or it may be constituted by an apertured plate. It is desirable to provide the wall 47 with large interstices, apertures or cutouts to promote the circulation of air around and resultant cooling of bottles 16 during transport toward the belt 24.

The receptacle 9' of FIGS. 4 and 5 differs from the receptacle 9 of FIGS. 1 to 3 in that it is dimensioned to accommodate one bottle at a time, i.e., such receptacle 9' will be used in blow molding machines whose mold defines a single mold cavity. The frame 15' is formed of metallic strip stock and is of rectangular outline. This frame 15' carries lugs 39 which are preferably welded thereto and which are connected to ring-shaped followers 40 slidably mounted on the guide rails 12. The connectors which secure the lugs 39 to the followers 40 are constituted by bolts 41. FIG. 5 merely shows the right-hand guide rail 12 and the corresponding follower 40. The left-hand part of FIG. 5 shows the manner in which the left-hand leg or flange 20' of the yoke 19' is mounted on the frame 15' by means of a horizontal pivot pin 42 carried by the frame 15'. The numeral 43 denotes a nut, washer or split ring which prevents axial movement of the leg 20' along the pin 42. The pin 42 is eccentric with reference to the frame 15' so that the gate 18B' tends to move to closed position when its extensions 21' are disengaged from the conveyor 13 (not shown in FIGS. 4 and 5). The bars 14' are welded to the frame 15' and extend substantially vertically downwardly. If desired, the cage 18A' can be reinforced by stiffening bars 44 which connect all of or selected bars 14' to each other. Such stiffener or stiffeners 44 can be used with equal advantage in the receptacle 9 of FIGS. 1 to 3. The distances between the bars 14' are such that these bars prevent lateral escape of a bottle but permit substantially unimpeded circulation of air to promote rapid cooling of bottles.

It is clear that the receptacle 9 or 9' can be modified in a number of ways without departing from the spirit and scope of my invention. For example, the frame 15 or 15' may assume a circular or oval shape or the shape of a regular or irregular polygon of other than rectangular outline. Also, the bars 14 or 14' may be replaced by an apertured skirt of sheet metal or the like. All that counts is to provide the receptacle with a cage and with a gate both strong enough to properly support bottles during transfer into registry the conveyor 13 and to preferably insure that the receptacle will allow for at least some circulation of air around the bottle or bottles in the cage.

FIG. 5 illustrates the bottom portion 45 of a freshly blown bottle by phantom lines. This bottom portion 45 is in mere multi-point or multi-linear contact with the rods 18' of the gate 18B' and the distance P between the rods 18' is sufficient to allow for unimpeded passage of surplus material 7 or 25, depending upon whether the bottles are discharged in upright position or upside down. Such mere multi-point or mere linear contact between the bottles and the gate insures that a bottle can slide along the rods 18 or 18' with minimal friction when the gate 18B or 18B' is pivoted to open position.

FIG. 6 illustrates a modified transporting apparatus wherein the receptacle 109 is reciprocable along guide rails 12 and is provided with a horizontally reciprocable gate 118B. The cage 118A has two downwardly extending supporting arms 28a, 29a which are provided with eyes 28, 29 serving to guide the rods 118 of the gate 118B. The extensions 121 of the rods 118 strike against the stop 22 of the conveyor 13 when the receptacle 109 approaches its second end position whereby the gate 118B comes to a halt and permits gravitational descent of one or more bottles from the chamber defined by the cage 118A. The rods 118 are connected to each other by transversely extending rods 27. The right-hand end portions 146 of the rods 118 will strike against the frame 110 of the blow molding machine before the receptacle 109 returns to its first position whereby the gate 118B closes the lower end of the cage 118A.

Referring finally to FIG. 7, there is shown a portion of a further transporting apparatus wherein the partition 35 of FIGS. 1 and 2 is replaced by an upwardly diverging guide duct 37 which is mounted on the rod 32 at the upper end of the piston rod 34 and is movable upwardly into the space between the mold sections 3a, 3b when the mold is open. When the duct 37 is idle, it is accommodated in the funnel 30'. One wall 38 of the funnel 30' is provided with a slot which permits downward movement of the rod 32 while the duct 37 travels toward its lower end position. The duct 37 may be used in machines whose molds are provided with a single cavity or with plural cavities.

In each of the illustrated embodiments, the mold is assumed to have one or more cavities which are configurated to form plastic bottles and wherein the neck portions are located at a level above the bottom portions. In such blow molding apparatus, the surplus material 7 is broken off in a first step and drops through the aperture or apertures of the gate, the bottles are separated from their mandrel or mandrels in the next step, and the surplus material 25 is separated from the mandrel or mandrels in the final step, after the bottles are separated from the mandrel or mandrels, either in response to upward movement of mandrels or in response to admission of blasts of air through such mandrels.

The situation is similar if the blow molding machine is designed to form bottles or like articles but is not provided with one or more mandrels. Such a machine will utilize one or more needles which admit gas into the neck portions of bottles. The surplus which is removed from bottles in the region where the needle has penetrated the plastic material is preferably ejected from the mold subsequent to descent of bottles into the receptacle and after the receptacle has been caused to leave its first position of registry with the mold.

It is further clear that the mold can be designed to produce two or more differently dimensioned and/or configurated articles in a simultaneous operation and that the receptacle can be shaped to accommodate two or more different articles at a time. Also, the receptacle may be readily converted to accept larger, smaller, wider, narrower, shorter and/or longer articles (for example, by changing the position and/or dimensions of the separating wall 47 shown in FIG. 1). Finally, and if the mold is designed to produce two or more articles at a time, the transporting apparatus of my invention may include two or more separate receptacles each of which is movable into registry with one of several mold cavities and each of which can deliver articles to the same conveyor or each of which delivers articles to a separate conveyor. All such modifications will be readily understood without illustration.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a blow molding machine wherein hollow articles formed in the cavity of an open-and-shut mold descend by gravity and wherein surplus material which is separated from articles also descends by gravity from the open mold, a transporting apparatus comprising a receptacle movable between a first position at a level below and in line with the direction of descent of articles and surplus material and a second position out of registry with such direction, said receptacle having a bottom portion movable between a closed position in which it supports articles during travel of the receptacle from first to second position but permits further descent of surplus material and an open position to permit further descent of articles in the second position of said receptacle; and means for accepting articles descending from said receptacle in the second position thereof.

2. A transporting apparatus as defined in claim 1, wherein said bottom portion has at least one aperture large enough to permit passage of surplus material in the closed position of said bottom portion.

3. A transporting apparatus as defined in claim 1, further comprising cooperating first and second opening means provided on said receptacle and said accepting means to move said bottom portion to open position in response to movement of said receptacle to second position.

4. A transporting apparatus as defined in claim 1, wherein said receptacle further comprises a cage defining an article-receiving chamber and movably supporting said bottom portion.

5. A transporting apparatus as defined in claim 4, wherein said cage includes an annular frame and bars affixed to and extending downwardly from said frame.

6. A transporting apparatus as defined in claim 5, wherein said cage further comprises stiffening means connecting said bars with each other at a level below said frame.

7. A transporting apparatus as defined in claim 1, wherein said bottom portion comprises a grate including a network of bars or rods defining between themsleves at least one aperture large enough to permit passage of surplus material.

8. A transporting apparatus as defined in claim 1, wherein said receptacle further comprises a cage defining an article receiving chamber and connecting means securing said bottom portion to said cage.

9. A transporting apparatus as defined in claim 8, wherein said connecting means comprises a U-shaped yoke having two flanges secured to said cage for pivotal movement about a substantially horizontal axis and a web secured to said bottom portion.

10. A transporting apparatus as defined in claim 9, wherein said axis is eccentric with reference to said cage.

11. A transporting apparatus as defined in claim 1, further comprising guide means provided at a level above said receptacle in the first position thereof to direct descending articles into said receptacle.

12. A transporting apparatus as defined in claim 11, wherein said guide means comprises a substantially upright funnel.

13. A transporting apparatus for use in a blow molding machine whose mold is provided with plural cavities for simultaneous production of several blow molded articles as defined in claim 1, further comprising partitioning means movable between the articles in response to opening of the mold to prevent direct contact between such articles during descent into said receptacle.

14. A transporting apparatus as defined in claim 13, wherein said partitioning means comprises blade means and means for moving said blade means between freshly formed articles in response to opening of said mold.

15. A transporting apparatus as defined in claim 13, wherein said partitioning means is movable to a retracted position when the mold is closed, and further comprising a plurality of guide means interposed between the mold and said receptacle to guide the articles during descent while said receptacle assumes said first position, said guide means defining between themselves space for the partitioning means in retracted position of the latter.

16. A transporting apparatus as defined in claim 1, further comprising guide means for guiding the articles during descent into said receptacle, said guide means being movable between a raised position between the mold sections in response to opening of the mold to spacedly surround a freshly formed article and a lower position at a level below the mold when the latter is closed.

17. A transporting apparatus as defined in claim 16, wherein said guide means comprises hollow shaft means and further comprising additional guide means disposed between the mold and said receptacle to guide the articles descending from said shaft means and to accommodate said shaft means in the lower position thereof.

18. A transporting apparatus as defined in claim 1, wherein said receptacle is reciprocable between said first and second positions in a substantially horizontal path and wherein said bottom portion is reciprocable with respect to the remainder of said receptacle.

19. A transporting apparatus as defined in claim 1, wherein said receptacle is apertured to permit circulation of air around the articles therein.

20. A transporting apparatus as defined in claim 1, wherein said receptacle is dimensioned to accommodate several articles at a time and comprises wall means for subdividing its interior into plural compartments for individual articles.

References Cited

FOREIGN PATENTS 472,122  6/1952  Italy.

ALLEN N. KNOWLES, *Primary Examiner.*

U.S. Cl. X.R.

209—74, 83, 98